(12) United States Patent
Heinz

(10) Patent No.: US 10,836,009 B2
(45) Date of Patent: Nov. 17, 2020

(54) MILLING ROLLER, SURFACE MILLING MACHINE AND METHOD FOR REMOVAL OF BONDED FLOOR COVERINGS

(71) Applicant: WOLFF GmbH & Co. KG, Ilsfeld (DE)

(72) Inventor: Daniel Heinz, Ilsfeld (DE)

(73) Assignee: WOLFF GMBH & CO. KG, Ilsfeld (DE)

( * ) Notice: Subject to any disclaimer, the term of this patent is extended or adjusted under 35 U.S.C. 154(b) by 0 days.

(21) Appl. No.: 16/655,697

(22) Filed: Oct. 17, 2019

(65) Prior Publication Data
US 2020/0122287 A1 Apr. 23, 2020

(30) Foreign Application Priority Data
Oct. 19, 2018 (DE) .......................... 10 2018 217 939

(51) Int. Cl.
*B24B 7/18* (2006.01)
*B23C 5/24* (2006.01)
(Continued)

(52) U.S. Cl.
CPC ............ *B24B 7/188* (2013.01); *B02C 18/145* (2013.01); *B23C 5/2472* (2013.01); *B27G 13/04* (2013.01);
(Continued)

(58) Field of Classification Search
CPC ..... E04G 23/006; B02C 18/145; A47L 11/08; B24B 7/18
(Continued)

(56) References Cited

U.S. PATENT DOCUMENTS 1,282,285 A 10/1918 Plank
2,576,607 A 11/1951 Knudson et al.
(Continued)

FOREIGN PATENT DOCUMENTS

DE 10 2004 050 183 B3 6/2006
DE 10 2011 003 010 A1 12/2011
(Continued)

OTHER PUBLICATIONS

German Search Report for German Patent Application No. 10 2018 217 939.5, dated Jun. 3, 2019, 5 pages.
(Continued)

*Primary Examiner* — Sunil Singh
(74) *Attorney, Agent, or Firm* — Westman, Champlin & Koehler, P.A.

(57) ABSTRACT

The present invention relates to a milling drum for removing glued-down floor coverings, in particular wooden floor coverings, preferably parquet floor coverings, in particular multilayer parquet, with a predetermined milling width which determines the width of a floor surface section by running the milling drum over the floor surface section to be machined, having a plurality of cutting plates which are arranged tangentially on the milling drum and which are arranged in a distributed manner on the milling drum, such that, upon a complete revolution of the milling drum, the entire milling width is operable with at least one cutting plate and such that a common width of the cutting plates being in contact simultaneously with the floor surface section to be machined is always smaller than the milling width. The present invention further relates to a surface milling cutter for removing glued-down floor coverings by use of such a milling drum, and a method for removing glued-down floor coverings by use of such a surface milling cutter.

14 Claims, 5 Drawing Sheets

(51) Int. Cl.
  *B27G 13/04* (2006.01)
  *B28D 1/18* (2006.01)
  *E04G 23/00* (2006.01)
  *B02C 18/14* (2006.01)

(52) U.S. Cl.
  CPC ........... *B28D 1/188* (2013.01); *E04G 23/006* (2013.01); *B23C 2200/0455* (2013.01)

(58) Field of Classification Search
  USPC ............ 241/294, 296, 300.1; 299/39.1, 39.4, 299/39.8; 407/58
  See application file for complete search history.

(56) References Cited

U.S. PATENT DOCUMENTS

| | | | | |
|---|---|---|---|---|
| 4,000,860 A | * | 1/1977 | Gotham | ................ B02C 18/148 241/242 |
| 4,684,297 A | | 8/1987 | Funakawa et al. | |
| 6,116,305 A | | 9/2000 | Lin | |
| 7,959,099 B1 | * | 6/2011 | Cox | ......................... B02C 18/18 241/294 |
| 2007/0292219 A1 | * | 12/2007 | Craig | ...................... B23C 5/207 407/48 |
| 2010/0074705 A1 | | 3/2010 | Carr | |

FOREIGN PATENT DOCUMENTS

| | | |
|---|---|---|
| DE | 10 2016 103 199 A1 | 8/2017 |
| KR | 101383136 B1 | 4/2014 |
| WO | 2004/058464 A1 | 7/2004 |

OTHER PUBLICATIONS

European Search Report for foreign priority No. EP19203527.7, dated Mar. 6 2020, 8 pages.
European Search Report for foreign priority No. EP19203524.4, dated Mar. 19, 2020, 8 pages.

\* cited by examiner

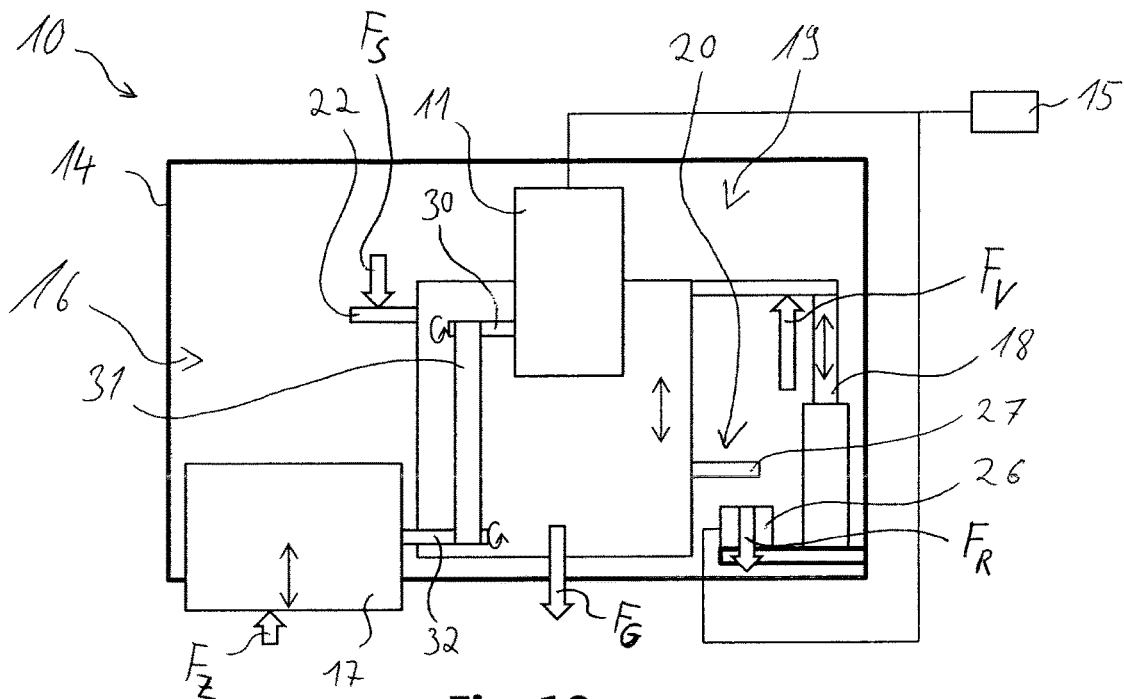
Fig. 10
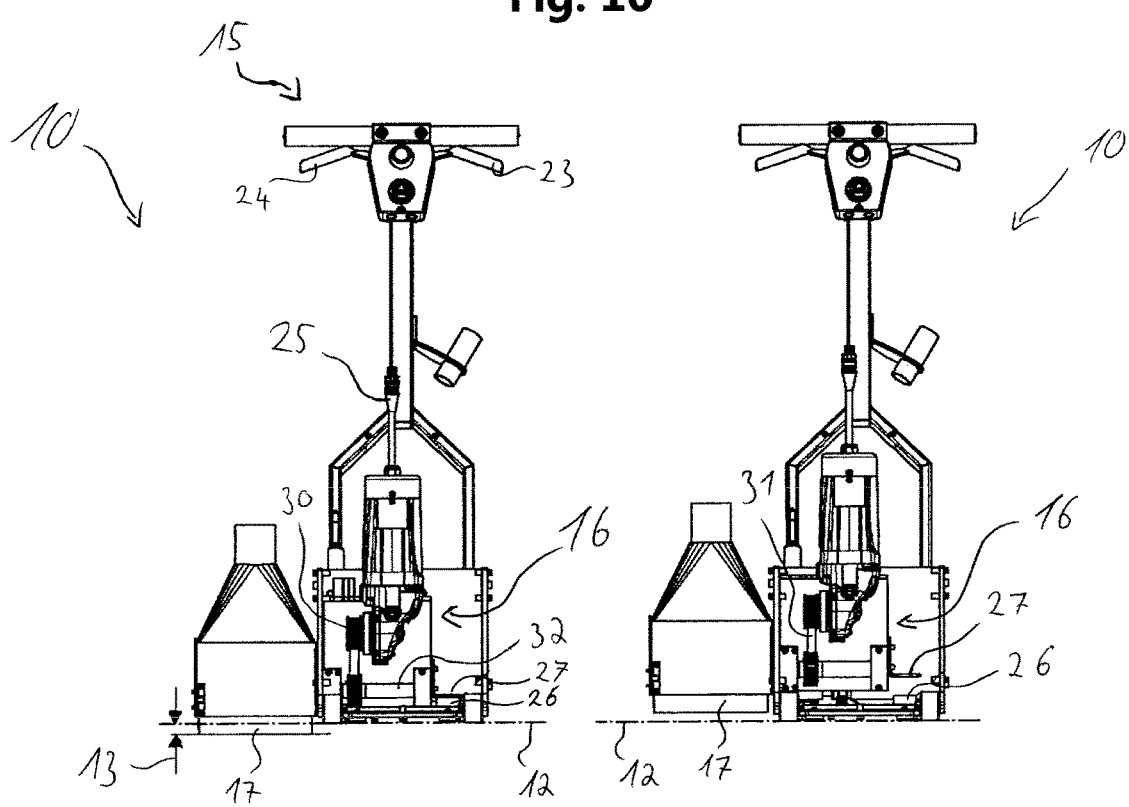
Fig. 11A      Fig. 11B

MILLING ROLLER, SURFACE MILLING MACHINE AND METHOD FOR REMOVAL OF BONDED FLOOR COVERINGS

TECHNICAL FIELD

The present invention relates to a milling drum for removing glued-down floor coverings, a surface milling cutter comprising such a milling drum as well as a method for removing glued-down floor coverings comprising such a milling drum.

BACKGROUND ART

Various types of machining modes exist for machining parquet floors. For example, polishing machines are often used for so-called floor preparation. Another type of machining is floor renovation, for which milling or grinding machines are often used to remove part of the top parquet layer. A penetration depth into the parquet is only small, that is to say usually less than 2 mm.

In addition, so-called floor removal exists as a further type of machining. For this purpose, the floor covering must be completely removed. This is particularly difficult with glued-down multilayer parquet floors, because modern parquet glues have a high flexibility over their lifetime. Therefore, a lot of time and effort is required to remove such floors. It is often necessary to saw in the panels, for example by using a hand-held circular saw. Only then the floor covering may be partially removed by using a so-called floor stripper, as sold by the applicant, that is to say a machine-driven impact blade which is applied to the side of the panels in the area of the glue. Particularly with multi-layer parquet floors, however, due to the high flexibility of the glue, which may partially absorb the impact energy, residues of the carrier layer of the panels often adhere to the floor. The residues of the carrier, which usually consists of medium-density or high-density fibreboards, must then be removed by reworking.

SUMMARY OF INVENTION

In light of the above background, it is an object of the present invention to provide an improved tool and machine as well as an improved method for removing glued-down floor coverings, in particular parquet floor coverings.

Accordingly, the present invention provides:

A milling drum for removing glued-down floor coverings, in particular parquet floor coverings, the milling drum comprising: a predetermined milling width which defines the width of a floor surface section by running the milling drum over the floor surface section to be machined, having a plurality of cutting plates which are arranged tangentially on the milling drum and which are arranged in a distributed manner on the milling drum, such that, upon a complete revolution of the milling drum, the entire milling width is operable with at least one cutting plate and such that a common width of the cutting plates being in contact simultaneously with the floor surface section to be machined is always smaller than the milling width.

A surface milling cutter for removing glued-down floor coverings, in particular parquet milling cutter for removing glued-down parquet floor coverings, comprising: a drive motor, and a milling drum to be driven by the drive motor.

A method for removing a floor covering, in particular by use of a surface milling cutter, comprising the steps: driving a milling drum, in particular a milling drum according to the present invention, which has a plurality of tangentially oriented cutting plates distributed around the circumference of the milling drum, which cutting plates each have a smaller width compared with a milling width of the milling drum, at a predetermined driving power; bringing the milling drum in contact with the floor covering; and adjusting a milling depth penetrating the floor covering and a milling speed such that a cutting power is less than or equal to the predetermined driving power.

The present invention is based on the concept that a milling operation may enable and greatly facilitate floor removal in a single step. However, the driving power available with domestic mains voltage in order to remove glued-down parquet floors by using tools which are so far known to the applicant is not sufficient because of the required penetration depth. A much more powerful drive and a high power current connection would therefore be necessary, but this is not readily available in many places.

Therefore, the present invention is based on the concept to create a new type of milling drum, also referred to as a cutting drum, by distributing a plurality of cutting plates on the milling drum in a tangential arrangement in such a way that it is possible to machine a section of the floor surface over the entire milling width, wherein the cutting plates are only partially in contact with the section of the floor surface, that is to say not over the entire milling width. Accordingly, the common width of the cutting plates that are simultaneously in contact with the floor surface section to be machined is always smaller than the milling width.

The alignment of the cutting plates is at least substantially tangential, that is to say in any case more tangential than radial, in particular with an angular deviation of less than 30°, preferably less than 10°, for example within the manufacturing tolerance, deviating from an exact tangential alignment. An exact tangential alignment, that is to say with a right angle of a surface normal of the cutting plate to the circumferential surface of the milling drum, is of course possible.

The tangential alignment of the cutting plates makes it possible to achieve a steeper wedge angle of the cutting edge of the cutting plates compared with a radial alignment, such that the cutting plates may separate the floor covering more easily i.e. with less cutting power. Furthermore, according to the present invention, the driving power is always only required for the cutting power of the part of the cutting plates that is currently in contact with the floor surface section. This combination reduces the overall cutting power required to remove glued-down floor coverings and thus also the driving power required. In this way, the use of a milling drum for removing glued-down floor coverings, in particular wood floor coverings, preferably all types of parquet floor coverings, in particular multi-layer parquet, by using conventional domestic mains voltage at the respective maximum permissible current, for example in Europe of 230 V and 16 A, is made possible according to the present invention. Thus, even when using electricity provided by a domestic power outlet, it is possible to remove the entire thickness of the floor covering in a single milling step.

The penetration depth or milling depth and the milling speed may be adjusted according to the present invention such that the electrical power consumption of a surface milling cutter remains below the maximum permissible power at mains voltage, e.g. 3680 W in Europe. Preferably the milling depth is adjusted according to the expected thickness of the floor covering wherein the milling speed is adjusted accordingly such that the electrical power consumption is not exceeded.

In addition, the lower cutting power required by the milling drum, according to the present invention, reduces the wear and tear on the cutting edges of the cutting plates and thus increases their tool life. Furthermore, it is the particular arrangement of the cutting plates according to the present invention which allows the penetration depth required for glued-down parquet floors for floor covering removal when using mains voltage.

At higher penetration depths, each cutting plate may cover a larger angular sector of the milling drum circumference, enabling greater spacing between the cutting plates in the circumferential direction. In this way, according to the present invention, a smaller number of cutting plates is required to cover the entire circumference and milling width. This reduces the amount of material and maintenance required for the cutting plates.

In this way, the surface milling cutter according to the present invention achieves a large cutting cross section despite the limited electrical driving power available.

Advantageous embodiments and modifications are apparent from the dependent claims as well as from the description with reference to the drawings.

According to one embodiment, the cutting plates are spaced from each other in the circumferential direction, such that only one cutting plate at a time is in contact with the floor surface section to be machined. This ensures that only the cutting power for a single cutting plate has to be applied at a time and that no higher driving power is required than for this one cutting plate.

The spacing between the cutting plates in the circumferential direction may in particular be greater than the width of a single cutting plate. In the case of indexable cutting plates, the spacing between a rear cutting edge of a front indexable cutting plate and a front cutting edge of a rear indexable cutting plate may be greater than or equal to the width of an indexable cutting plate.

An axial offset between adjacent cutting plates, in particular indexable cutting plates, may also be provided for in one embodiment. In this case, for example, the cutting plates may be staggered in two rows distributed over the circumference of the milling drum. Accordingly, a second row may be provided with an offset of one cutting plate width, which machines the areas of the gaps between the cutting plates of the first row during a complete revolution of the milling drum.

According to one embodiment, the cutting plates are arranged axially and radially evenly distributed on a common circumferential surface of the milling drum, such that the entire milling width may be operable evenly upon one complete revolution. Accordingly, the floor surface section is machined by at least one cutting plate over the entire milling width during a complete revolution. In particular, the cutting plates may be attached to the circumferential surface. A mounting recess in the circumferential surface may be provided for each cutting plate for this purpose. Alternatively or additionally, a chip-receiving recess may be provided in the circumferential surface for each cutting plate such that jamming or lifting of the milling drum may be avoided.

According to one embodiment, the cutting plates are arranged in a spiral type of form on the circumferential surface. Preferably, the arrangement is a double-row spiral type of form. In this way, the cutting plates may be easily positioned at a spacing from each other, which spacing facilitates assembly and maintenance.

The cutting plates are configured as indexable cutting plates. In particular, they are carbide indexable cutting plates. In this way, when the tool life of a cutting edge has expired, a new assembly of the cutting plates is not necessary every time. Instead, cutting plates may be turned at least once such that a "fresh" cutting edge is ready for operation. An indexable cutting plate comprises at least two cutting edges. Triangular type indexable cutting plates having three cutting edges are also conceivable. In particular, square type indexable cutting plates having four cutting edges are provided.

According to one embodiment, the cutting plates are attachable independently to the milling drum, in particular to the circumferential surface of the milling drum. In this way, individual cutting plates are replaceable independently of one another. This also enables the cutting plates to be connected directly to the circumferential surface.

According to one embodiment, the milling width is in a range of 100 mm to 500 mm, in particular 100 mm to 300 mm, preferably 150 mm to 250 mm, for example 200 mm. In this way, a milling width is provided which is sufficient for large-area floor removal.

According to one embodiment, the width of a cutting plate ranges from 10 mm to 50 mm. In particular, a cutting plate has a width of 10 mm to 30 mm. A preferred range for the width of the cutting plate is 15 mm to 25 mm. In this range, penetration of a single tangentially aligned cutting plate into a parquet floor covering is possible down to the depth required for floor removal, e.g. up to 30 mm, in particular up to 25 mm, at least down to 20 mm, with a cutting power which may be achieved with a motor driven by mains voltage or by the maximum power specified by the mains voltage.

According to one embodiment, the cutting plates overlap each other in an axial direction. In particular, the overlap is less than half the width of a cutting plate. Preferably the overlap is less than one tenth of the width of a cutting plate. For example, the overlap is less than 2 mm. In particular, the overlap is in reference to a complete revolution. In particular, the overlap may also be provided between cutting plates of different rows.

According to one embodiment of a surface milling cutter, the drive motor has a predetermined driving power, wherein the individual cutting plates for separating a predetermined floor covering, in particular parquet floor covering, are configured to have a predetermined maximum cutting power which is below the predetermined driving power. The predetermined driving power is in particular the maximum mechanical driving power achievable with domestic mains voltage. In Europe, for example, where the maximum permissible power consumption at mains voltage is 3680 W, this may be less than or equal to 3 kW. This enables reliable operation of the surface milling cutter at mains voltage.

According to one embodiment, the surface milling cutter has a predetermined maximum milling depth. The individual cutting plates are each configured to be able to separate the predetermined floor covering at the maximum milling depth with the predetermined maximum cutting power. This ensures reliable operation of the surface milling cutter at maximum milling depth.

According to one embodiment, the predetermined maximum milling depth is in a range of 3 mm to 30 mm. In particular, the range may be from 5 mm to 30 mm, preferably 10 mm to 30 mm or 15 mm to 30 mm. Particularly preferred are ranges from 15 mm to 25 mm, for example 20 mm. In particular, the actual milling depth is freely adjustable in the range limited by the maximum milling depth. In this way it is possible to completely remove even thick glued-down floor coverings.

According to a preferred embodiment, the predetermined driving power is lower than the maximum permissible power consumption, in particular 3680 W, at mains voltage. In particular, the mechanical driving power depends on the power loss of the motor and is configured in such a way that the electrical input power is less than or equal to the maximum permissible power at mains voltage, in particular 3680 W. In particular, the mechanical driving power may be in a range of 2.5 to 3 kW, for example 2.6 kW.

The above embodiments and modifications may be combined with each other in any sensible way. Further possible embodiments, modifications and implementations of the present invention also include combinations of features of the invention described previously or in the following with respect to the exemplary embodiments, which are not explicitly mentioned. In particular, the skilled person will also add individual aspects as improvements or additions to the respective basic embodiment of the present invention.

BRIEF DESCRIPTION OF THE DRAWINGS

The present invention will be explained in more detail below using the examples given in the schematic figures of the drawing, wherein:

FIG. 10 shows a schematic functional diagram of a surface milling cutter;
FIG. 11A shows a front view of a surface milling cutter in operational position;
and
FIG. 11B shows a front view of a surface milling cutter in idle position.

The enclosed Figures are intended to provide a better understanding of the embodiments of the present invention. The Figures illustrate exemplary embodiments and provide in combination with the description a better understanding of principles and concepts of the invention. Further embodiments and many of the advantages mentioned result from the Figures. Elements shown in the Figures are not necessarily drawn to scale.

In the Figures, like elements, features and components having the same function and effect are indicated by like reference signs, unless otherwise specified.

DESCRIPTION OF EXEMPLARY EMBODIMENTS

Figure 1:
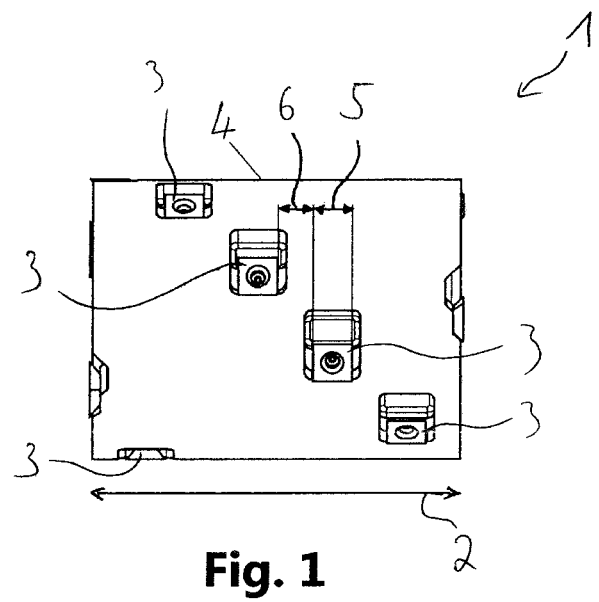
FIG. 1 shows a front view of a milling drum.

FIG. 1 shows a front view of a milling drum 1.

The milling drum 1 is configured to be able to remove glued-down parquet floor coverings, in particular multi-layer parquet. The milling drum 1 comprises a predetermined milling width 2, which defines the width of a floor area section to be machined when the milling drum 1 performs one revolution. For removing the floor covering, a plurality of cutting plates 3 is arranged tangentially on the milling drum 1 in a distributed fashion.

The cutting plates 3 are arranged axially and radially evenly distributed on a common circumferential surface 4 of the milling drum, such that the entire milling width 2 is operable evenly during one complete revolution. When the milling drum 1 has completed one revolution, the entire milling width 2 is thus operable with at least one cutting plate 3, which is configured to be considerably narrower than the milling width. For example, with a milling width 2 of 200 mm, for example, the width 5 of a cutting plate 3 may be 21 mm. Variations thereof are possible in other embodiments.

Meanwhile, the cutting plates 3 are arranged in a spiral type of form on the circumferential surface 4. The axial distribution is provided in such a way that a gap 6 is provided between two adjacent cutting plates in the axial direction. The distribution is therefore of a double-spiral type form having an axial offset of about one cutting plate width. A second row of cutting plates is therefore provided, which second row is hidden to a large extent in the Figure, and which second row is configured to machine the areas of the gaps 6 between the cutting plates 3 of the first row during a complete revolution of the milling drum 1.

Various types of distribution are of course also possible in other embodiments. However, the distribution of the cutting plates always results in a significantly smaller overall contact width of the cutting plates 3 with the floor covering as compared with the milling width. In other words, a common (i.e. combined) width of the cutting plates 3 that are in contact with the floor surface section to be machined at a time is always smaller than the milling width 2.

Figure 2:
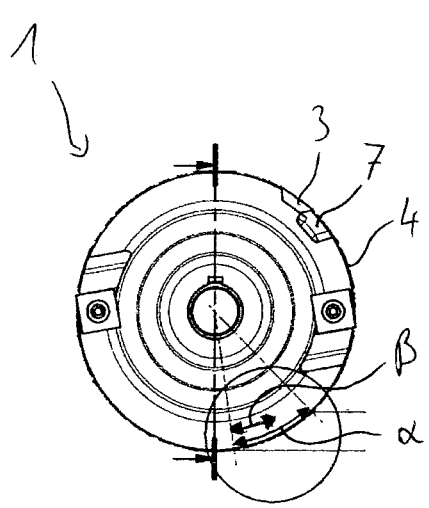
FIG. 2 shows a side view of a milling drum.

FIG. 2 shows a side view of a milling drum 1.

In the side view, an angular section α is drawn which indicates a spacing between the cutting edges of the cutting plates 3 in the circumferential direction. A free spacing β between the cutting plates 3 in the circumferential direction is greater than the width of a cutting plate 3.

The cutting plates 3 are configured as so-called indexable cutting plates, that is to say having cutting edges on several sides. In this example, the indexable cutting plates are square having four identical cutting edges. Accordingly, the free spacing β between adjacent indexable cutting plates from a rear cutting edge of a front indexable cutting plate to a front cutting edge of a rear indexable cutting plate is greater than the width of an indexable cutting plate. In this way it is achieved that a section of the floor surface to be machined is only in contact with a single cutting plate 3 at a time. In addition, the free spacing β in the circumferential direction also serves as installation space for a chip-receiving recess 7 in the circumferential surface 4.

Figure 3:
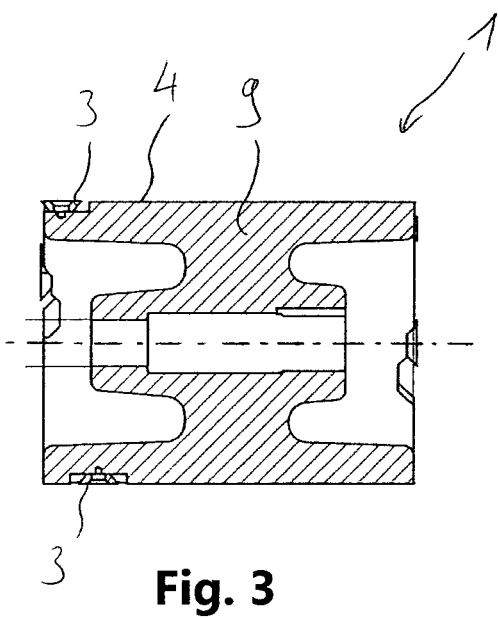
FIG. 3 shows a longitudinal view of a milling drum.

FIG. 3 shows a longitudinal sectional view of a milling drum 1.

As may be seen in this sectional view of FIG. 1, the circumferential surface 4 is the circumferential surface of a common drum body 9.

As is shown, the upper side of the circumferential surface 4 is provided with a cutting plate 3 of a first row, and the lower side of the circumferential surface 4 is provided with a cutting plate 3 of a second row. The cutting plates 3 have a slight axial overlap with each other, which overlap is in particular smaller than 2 mm, as shown in FIG. 3 for example 1 mm. This is the same for all other cutting plates 3 of both rows. This ensures that the entire milling width 2 is covered.

Figure 4:
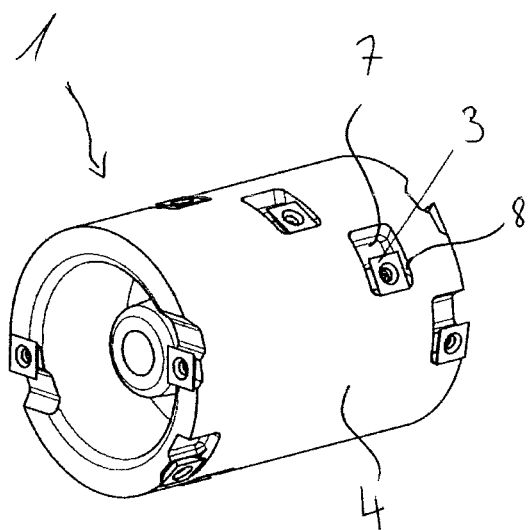
FIG. 4 shows a perspective view of a milling drum.

FIG. 4 shows a perspective view of a milling drum 1.

In this illustration, the mounting of the cutting plates 3, which are configured as indexable cutting plates, in the mounting recesses 8 of the circumferential surface 4 directly adjacent to the chip-receiving recess 7 is clearly visible. The cutting plates 3 may therefore be attached to the milling drum 1 independently of one another. Each indexable cutting plate is fixed in its mounting recess 8 on the circumferential surface 4 by use of its own fixing means, e.g. a screw, in the drum body of milling drum 1. By loosening the screw, each of the indexable cutting plates may be turned and fixed again by tightening the screw. One edge of the mounting recess 8 may support the cutting plate 3 laterally and serve as anti-rotation means.

Figure 5:
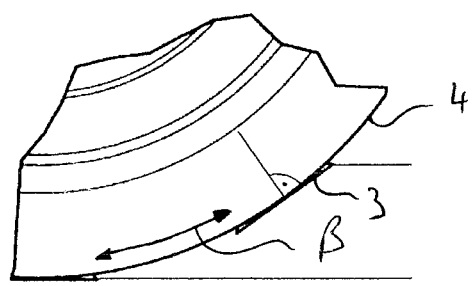
FIG. 5 shows a detailed view of a section of the circumferential surface of the milling drum of FIG. 2.

FIG. 5 shows a detailed view of a circumferential surface section of the milling drum 1 of FIG. 2.

The detailed view of FIG. 5 shows that the cutting plates 3 are aligned tangentially with respect to the circumferential surface 4. Of course, minor tolerances, in particular possible production-related tolerances, which differ from an exact tangential alignment, are also possible, for example in the range +/−10°.

Furthermore, a certain radial offset of the cutting plate 3 with respect to the circumferential surface is also possible or adjustable. In this way, it is possible to adjust a chip thickness of the material which has been separated.

It may be seen in FIG. 5 that the cutting edges of the cutting plates 3 protrude in front of the circumferential surface 4 such that they cut off a chip when the material of a floor covering is penetrated. In the area of the free spacing β between the adjacent cutting edges, the chip-receiving recess 7 which is hidden in the Figure is arranged to receive the separated chip.

Accordingly, when the milling drum 1, which runs on a floor covering to be removed with the circumferential surface 4, rotates, the cutting edges engage in the floor covering material and cut the floor covering material successively, wherein the chips are each pushed into the chip-receiving recess 7. The chips that have been received may fall out of the chip-receiving recess again in the course of a full revolution, or may be withdrawn by suction.

Figure 6:
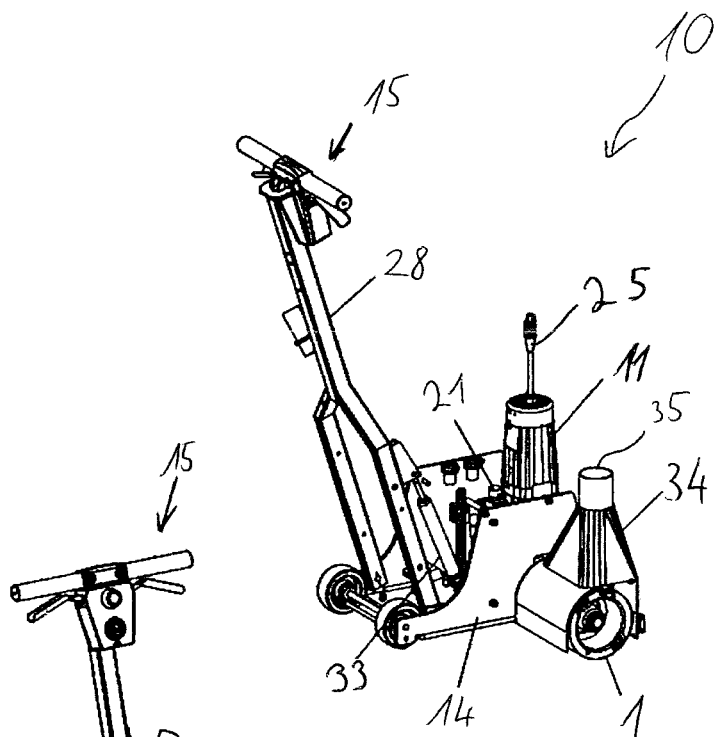
FIG. 6 shows a perspective side view of a surface milling cutter.

FIG. 6 shows a perspective side view of a surface milling cutter 10.

The surface milling cutter 10 is configured to remove glued-down parquet floor coverings and is accordingly configured as a parquet milling machine. The surface milling cutter 10 comprises, in addition to the milling drum 1 covered with a suction hood 34, a drive motor 11 for driving the milling drum 1, which may be controlled by an operation unit 15. The operation unit 15 is configured as a double handle having a double action switch and is attached to a shaft 28 which is coupled in a pivotable manner to a basic structure 14 of the surface milling cutter 1. In order to adjust the position of the operation unit 15 in height, the shaft 28 is additionally hinged to the basic structure 14 by use of a continuously adjustable and lockable blocking spring 33.

The drive motor 11 comprises a power supply 25, which is provided for coupling to a domestic power outlet by means of a plug connection (not shown for better clarity). Accordingly, the drive motor 11 comprises a predetermined driving power, which is limited by the maximum permissible electrical input power at mains voltage. In European countries the mains voltage is 230 V at a maximum permissible current of 16 A, such that the maximum permissible electrical power consumption is 3680 W, for example. Of course, depending on the region, other maximum permissible electrical input powers are provided for other mains voltages, for example 4400 W at 110 V and 40 A, wherein the predetermined driving power may be adjusted accordingly.

Accordingly, the individual cutting plates 3 are configured to separate the predetermined floor covering, in this case from parquet floor covering, with a predetermined maximum cutting power, which is below the predetermined driving power, but is sufficient for the milling depth required for removing the covering. Since the electrical conversion is always subjected to electric power losses and since a certain degree of safety should be provided, a predetermined driving power is usually less than or equal to 3 kW, for example 2.6 kW at 6500 rpm.

The surface milling cutter 10 comprises a predetermined maximum milling depth, e.g. of up to 30 mm, and the individual cutting plates 3 are each configured to separate the predetermined floor covering at the maximum milling depth with the predetermined maximum cutting power. However, an actual milling depth may be adjusted between zero and the maximum milling depth using an adjustment device 21. The maximum milling depth may, of course, be configured to be different in other embodiments, depending on the width of the cutting plates and the milling speed. According to the above parameters, a chip thickness that depends on the radial position of a cutting plate is adapted accordingly.

The separated chips may be extracted through the suction hood 34 via a suction connection 35, for example with a 70 mm suction hose.

Figure 7:
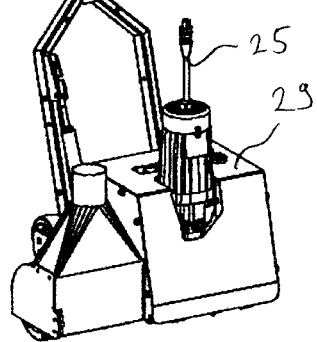
FIG. 7 shows a perspective front view of a surface milling cutter.

FIG. 7 shows a perspective front view of a surface milling cutter 10.

The surface milling cutter 10 of FIG. 7 corresponds to the surface milling cutter of FIG. 6, wherein a protective cover 29 is now provided in the area of the drive to ensure functional and operational safety.

Accordingly, a method for removing a floor covering may be carried out with such a surface milling cutter 10, for which purpose the milling drum 10 is first driven with a predetermined driving power. The milling drum is then brought into contact with the floor covering 12. In addition, a milling depth 13 which penetrates the floor covering and a milling speed are adjusted such that the cutting power is less than or equal to the predetermined driving power.

Figure 8:
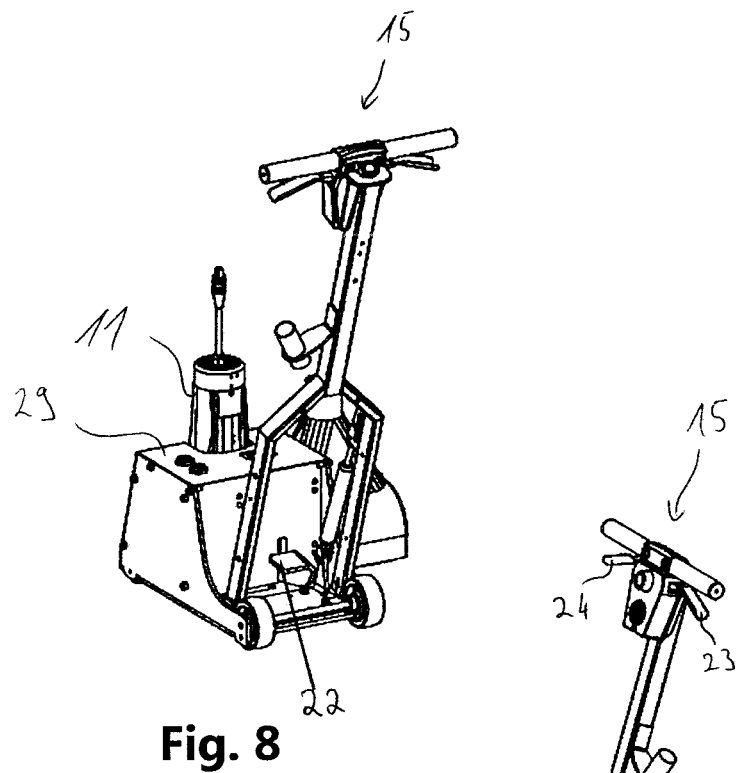
FIG. 8 shows a perspective rear view of a surface milling cutter.

FIG. 8 shows a perspective rear view of a surface milling cutter 10.

The surface milling cutter 10 is also configured to remove glued-down parquet floor coverings or is configured as a parquet milling machine. The surface milling cutter also comprises a basic structure 14 and an operating unit 15.

Figure 9:
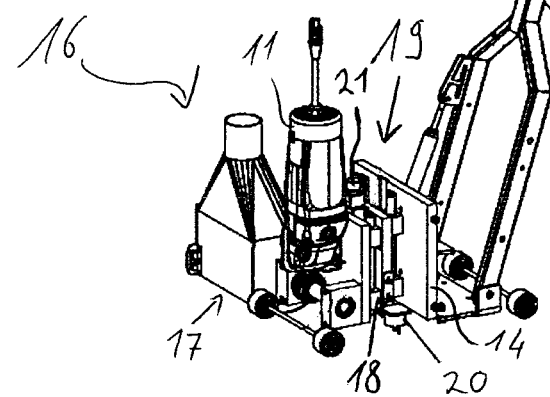
FIG. 9 shows a perspective side view of the surface milling cutter of FIG. 8 without protective cover.

FIG. 9 shows a perspective view of the surface milling cutter 10 of FIG. 8 without protective cover.

As may be seen in FIG. 9, a tool unit 16 which is linearly adjustable in height direction is provided on the basic structure 14. The tool unit 16 comprises both the drive motor 11, which may be controlled by means of the operation unit 15, and a milling tool 17 which is driven by the drive motor.

The milling tool corresponds to the milling drum 1, for example.

The adjustable bearing of the tool unit 16 serves to perform an adjustment between a raised rest position, in which the milling tool 17 is out of contact with a floor covering, and a lowered operating position, in which the milling tool 17 is in contact with the floor covering.

A lifting device 19 is provided in order to implement the adjustment mechanically. The lifting device 19 is configured to lower the tool unit 16 from the rest position into the operating position when an adjustment unit 22 is operated, which adjustment unit 22 is configured, for example, as a foot-operated pedal, and to hold it in the operating position when operating the operation unit 15. Furthermore, the lifting device 19 is configured to automatically lift the tool unit 16 into the rest position without operating the operation unit 15. In order to implement this embodiment, the lifting device 19 in the embodiment shown comprises spring biasing means 18 acting between the basic structure 14 and the tool unit 16, which biasing means 18 in this example are configured as a gas pressure spring coupled to the basic structure and to the tool unit. The gas pressure spring may be biased by lowering the tool unit 16 from the rest position to the operating position and released accordingly by lifting it from the operating position to the rest position. For automatic resetting, the gas pressure spring is configured to lift the tool unit 16 against the weight force from the operating position to the rest position.

In order to hold the tool unit 16 in the operating position when the operation unit 15 is operated, the lifting device 19 comprises a restraining device 20 acting between the basic structure 14 and the tool unit 17, which restraining device 20 is configured to be controllable by the operation unit 15. In the embodiment shown, the restraining device 20 is composed, for example, of an electromagnet 26 and a ferromagnetic counterpart 27, which in an actuated state apply a holding force to the tool unit 16 which is greater than the difference between the spring force of the spring biasing means 18 in the operating position and the weight force of the tool unit 16. To compensate for cutting forces, this holding force is dimensioned with a corresponding safety significantly greater than this difference. In this way, the restraining device 20 holds the tool unit 16 in the operating position against the spring preload when the operation unit 15 is operated. Without operating the operation unit 15 or, at the end of operation, the restraining device 20 automatically releases the tool unit 16 for lifting into the rest position.

The lifting device 19 also comprises the adjustment device 21 for the adjustable limitation of a milling depth 13, which is configured as a lifting spindle as an example. Thereby the height position of one stop and the electromagnet 26 is shifted.

The operation unit 15 is also configured as a double handle for two-handed switching. For this reason, independent actuating elements 23, 24 are provided on both handles, wherein the operation unit 15 may only be actuated for starting by simultaneous manipulation of both actuating elements 23, 24. In this way, when used as intended, operation to start the drive motor 11 is only possible with different hands, such that two-hand operation is necessary.

FIG. 10 shows a schematic functional diagram of a surface milling cutter 10.

The individual functional elements are shown here only schematically as functional boxes. The forces acting on the respective functional element are indicated with arrows at the respective boxes.

The weight force $F_G$ acting on the tool unit 16 due to gravity is always overcompensated by the preload force $F_V$ of the spring preload device 18 which also acts on the tool unit 16. In a rest position, in which the milling tool 17 is out of contact with a floor covering 12 and the adjustment unit 22 remains unactuated, the milling tool 17 thus remains in the rest position. Therefore the relation $F_V > F_G$ applies accordingly.

In order to assume the operating position, the operation unit 15 is first actuated to drive the milling tool 17. In the embodiment shown, the drive motor comprises an output shaft 30, which is coupled to a drive shaft 32 of the milling tool 17 via a transmission 31, which is configured here as a toothed belt drive, for example.

Next, a positioning force $F_S$ is exerted on the adjustment unit 22. In total, the positioning force $F_S$ and the weight force $F_G$ exceed the preload force $F_V$, such that $F_V < F_G + F_S$ applies.

The positioning force FS lowers the tool unit 16 and thereby the milling tool accordingly. The milling tool comes into contact with the floor covering such that the milling tool transmits 17 cutting forces $F_Z$ pressing upwards to the tool unit 16. The actuating force FS is large enough to overcome the cutting forces $F_Z$, such that $F_Z + F_V < F_G + F_S$ applies.

If the operating position is reached and the operation unit 15 remains actuated, the restraining force $F_R$ which is applied by the restraining device 20, here for example the electromagnet 26 and the ferromagnetic counterpart 27, also acts on the tool unit 16. The actuating force $F_S$ may then be removed or reduced to zero. In the operating position, the floor covering is being milled off such that cutting forces $F_Z$ continue to act. The relation $F_Z + F_V < F_G\ F_R$ applies accordingly.

If an operation of the operation unit 15 is interrupted or terminated, the restraining force $F_R$ is released. As a result, the milling tool 17 also comes out of contact with the floor covering 12, such that cutting forces are no longer effective. Accordingly, $F_V > F_G$ applies again, such that the milling tool 17 is automatically returned to the rest position.

FIG. 11A shows a front view of a surface milling cutter 10 in the operating position.

The actuating elements 23, 24 of the operation unit 15 are operated in this example. The tool unit 16 is lowered and held in the operating position by the electromagnet 26 such that the milling tool 17 is in contact with the floor covering 12 at a milling depth of 13.

The milling tool may, for example, be a milling drum 1, as shown in FIGS. 1 to 5. FIG. 11B shows a front view of a surface milling cutter 10 in its rest position.

The tool unit 16 is raised in this example such that the milling tool 17 is out of contact with the floor covering 12.

With such a surface milling cutter 10, a method for removing a glued-down floor covering 12 may be carried out accordingly, wherein first the operation unit 15 is operated for simultaneous operation of a drive motor 11 of the tool unit 16 and the restraining device 20. Accordingly, the milling tool 17, for example the milling drum 1, of the tool unit 16 is driven by the drive motor 11. The tool unit 16 is then lowered from a rest position into an operating position against the spring force of the spring biasing means 18, in particular by means of actuation of the adjustment unit 22. The lowering of the tool unit 16 comprises bringing the milling tool 17 in contact with the floor covering 12. When the operating position is reached, the tool unit 16 is then held in the operating position with the retaining device 20 for removing the glued-down floor covering. When the operation unit 15, in particular one of the two actuating elements 23, 24, is released, the drive motor 11 is stopped at the same time and the restraining device 20 is released. Thus, the tool unit 16 is automatically raised to the rest position by the spring force of the biasing means 18.

It may be seen in the FIG. 11B, that the rest position is above ground level. A stroke of the lifting device 19 which has overcome between the rest position and the operating position is therefore always greater than the milling depth 13.

In order to adapt to the thickness of the floor covering 12 to be removed, a predetermined milling depth 13 is set before actuating the operation unit 15. If this is reached after the milling tool has been brought into contact with the floor covering 12, the tool unit 16 is held at the predetermined milling depth 13. Accordingly, the operating position is determined by the predetermined milling depth.

In this aspect, a power supply 25 of the drive motor 11 is also connected to a domestic power outlet. Accordingly, before actuating the operation unit 15, a predetermined milling speed is set in such a way that a cutting power required at the predetermined milling depth 13 and at the predetermined milling speed is less than a maximum permissible power of the drive motor 11 at domestic mains voltage.

Although the present invention has been fully described above using preferred examples, the present invention is not limited thereto, but may be modified in many ways.

For example, it is conceivable not to adjust the tool unit linearly but by means of kinematics or transmission in order to reduce the actuating forces required for operation.

Alternative restraint devices 20 are also conceivable. For example, instead of an electromagnet, a locking slide controlled by the actuating element could also be brought into a position thereby locking the tool unit, which is brought into a non-locking position automatically when actuation is released or by the biasing force.

It is obvious that, with respect to the distribution of the cutting plates on the milling drum, various arrangements or patterns are conceivable as long as the entire milling width is covered.

A control device or regulating device may also be provided in order to adjust the milling speed, which is configured to automatically adjust the milling speed to the milling depth 13 at this maximum permissible power.

REFERENCE SIGNS LIST

1 Milling drum
2 Milling width
3 Cutting plate
4 Circumferential surface area
5 Width
6 Gap
7 Chip-receiving recess
8 Mounting recess
9 Drum body
10 Surface milling cutter
11 Drive motor
12 Floor covering
13 Milling depth
14 Basic structure
15 Operating unit
16 Tool unit
17 Milling tool
18 Spring biasing means
19 Lifting device
20 Restraint device
21 Adjustment device
22 Adjustment unit
23 Actuating element
24 Actuating element
25 Power supply
26 Electromagnet
27 ferromagnetic counterpart
28 Handle
29 Protective cover
30 Output shaft
31 Transmission
32 Drive shaft
33 Blocking spring
34 Suction hood
35 Suction connection
A spacing
B free spacing
$F_G$ Weight force
$F_R$ Retention force
$F_S$ Actuating force
$F_V$ Preload force
$F_Z$ Cutting forces

The invention claimed is:

1. Milling drum for removing glued-down floor coverings, the milling drum comprising:
a predetermined milling width which defines the width of a floor surface section by running the milling drum over the floor surface section to be machined,
having a plurality of cutting plates which are arranged tangentially on the milling drum and which are arranged in a distributed manner on the milling drum, such that, upon a complete revolution of the milling drum, the entire milling width is operable with at least one of the plurality of cutting plates and such that a common width of the cutting plates being in contact simultaneously with the floor surface section to be machined is always smaller than the milling width, wherein the cutting plates are spaced apart from one another in the circumferential direction, such that only one cutting plate is always contactable simultaneously with the floor surface section to be machined.

2. Milling drum according to claim 1, wherein the cutting plates are arranged axially and radially distributed in a uniform manner on a common circumferential surface of the milling drum, such that, upon a complete revolution of the milling drum, the entire milling width is uniformly machinable.

3. Milling drum according to claim 2, wherein the cutting plates are arranged spirally in a distributed manner on the circumferential surface.

4. Milling drum according to claim 1, wherein the cutting plates are configured to be indexable cutting plates.

5. Milling drum according to claim 1, wherein the cutting plates are attachable independently of one another to the milling drum.

6. Milling drum according to claim 1, wherein the milling width is in a range of 100 mm to 500 mm.

7. Milling drum according to claim 1, wherein the width of a cutting plate is in a range of 10 mm to 50 mm.

8. Milling drum according to claim 1, wherein the cutting plates have an axial overlap with one another which is provided in particular less than half a width of a cutting plate.

9. Surface milling cutter for removing glued-down floor coverings, comprising:
a drive motor, and
a milling drum according to claim 1 driven by the drive motor.

10. Surface milling cutter according to claim 9, wherein the drive motor has a predetermined driving power, wherein the individual cutting plates are configured to have a predetermined maximum cutting power which is below the predetermined driving power of the drive motor, for separating a predetermined floor covering.

11. Surface milling cutter according to claim 10, wherein the surface milling cutter has a predetermined maximum milling depth and the individual cutting plates are each configured to separate the predetermined floor covering at maximum milling depth with the predetermined maximum cutting power.

12. Surface milling cutter according to claim 11, wherein the maximum milling depth is in a range of 3 mm to 30 mm.

13. Surface milling cutter according to claim 10, wherein the predetermined driving power is less than a maximum permissible input power at mains voltage.

14. Method for removing a floor covering comprising the steps:
- driving a milling drum according to claim 1, which has a plurality of tangentially oriented cutting plates distributed around the circumference of the milling drum, which cutting plates each have a smaller width compared with a milling width of the milling drum, at a predetermined driving power;
- bringing the milling drum in contact with the floor covering; and
- adjusting a milling depth, which penetrates the floor covering, and a milling speed such that a cutting power is less than or equal to the predetermined driving power.

\* \* \* \* \*